(12) United States Patent
Lee et al.

(10) Patent No.: US 6,326,434 B1
(45) Date of Patent: Dec. 4, 2001

(54) EXTRUSION COMPOSITIONS WITH IMPROVED MELT FLOW

(75) Inventors: Chun D. Lee; Ramesh N. Shroff, both of Cincinnati; Jeffrey A. Jones, Morrow, all of OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/505,123

(22) Filed: Feb. 16, 2000

(51) Int. Cl.[7] .......................................................... C08F 8/50
(52) U.S. Cl. ............................ 525/194; 525/192; 525/240
(58) Field of Search ..................................... 525/192, 194, 525/240

(56) References Cited

U.S. PATENT DOCUMENTS

| | | | |
|---|---|---|---|
| Re. 31,518 | * | 2/1984 | Fischer .................................. 525/194 |
| 4,375,531 | | 3/1983 | Ross . |
| 4,948,840 | | 8/1990 | Berta . |
| 5,143,978 | | 9/1992 | Berta . |
| 5,302,454 | | 4/1994 | Cecchin et al. . |
| 5,552,482 | | 9/1996 | Berta . |
| 5,639,818 | | 6/1997 | Lee et al. . |
| 6,087,443 | * | 7/2000 | Sadatoshi et al. .................... 525/194 |

OTHER PUBLICATIONS

J.S. Borke: "Oscillatory Flow of Polypropylene and Its Effect on Conductor Eccentricity," *Proceedings of the International Wire & Cable Symposium*, 47, 294–294–298 (1998).

Ross, et al: *Ind. Eng. Chem. Prod. Res. Dev.*, 24: 194–154 (1985).

Wild et al.: "Development of High Performane TREF for Polyolefin Analysis" *Proceedings of Am. Chem. Soc., Div. of Polym. Mat. Sci. and Eng.*, 67:153 (1992).

* cited by examiner

*Primary Examiner*—Bernard Lipman
(74) *Attorney, Agent, or Firm*—Gerald A. Baracka; William A. Heidrich

(57) ABSTRACT

Extrusion compositions having improved melt stability and suitable for use in high-speed extrusion coating operations are disclosed. The compositions are a dynamically modified mixture of a first polymeric component which is a reactor-made or physically blended mixture of polypropylene and an ethylene-propylene copolymer, a second polymeric component which is a fractional melt index homopolymer or copolymer of ethylene and an organic peroxide.

20 Claims, No Drawings

EXTRUSION COMPOSITIONS WITH IMPROVED MELT FLOW

BACKGROUND OF THE INVENTION

1. Field of the Invention

The invention relates to compositions useful for extrusion coating wire and cables. More specifically, the compositions of the invention which exhibit improved melt flow under high shear comprise a blend of a major proportion of a first polymeric component which is a mixture of crystalline polypropylene homopolymer and amorphous or semi-crystalline ethylene-propylene copolymer and a minor proportion of a second polymer component which is a fractional melt index ethylene polymer, said blend dynamically modified in the presence of an organic peroxide.

2. Description of the Prior Art

Polyolefin resins are widely utilized for the construction of insulated wire and cable products. For high-speed extrusion of wire and cable insulation, the insulation composition should have a melt flow rate of about 1 to 5 g/10 min and, more preferably, 1.5 to 3.5 g/10 min for best results. Whereas polypropylene (PP) resins generally have better dielectric properties and abrasion resistance than polyethylene (PE) resins, processability problems have limited its use for extrusion coating of wire and cable products.

Particularly troublesome is the phenomenon called melt fracture. This phenomenon can be observed with virtually all polyolefin resins, including polyethylenes such as linear low density polyethylene (LLDPE) and high density polyethylene (HDPE); however, it is more pronounced and less easily controlled with PP resins. Melt fracture results in the distortion observed with extrudates obtained when resins are extruded through annular dies and capillaries at flow rates above certain critical limits. At first this appears as surface waviness or roughness but, as flow rates continue to increase, it results in the formation of helical extrudates and, ultimately, gross melt fracture.

Severe melt fracture during extrusion coating of electrical conductors results in non-uniform thickness of the insulation around the conductor, i.e., eccentricity. Failure to have the conductor consistently positioned at the geometric center of the construction, i.e., concentric, can result in decreased signal performance and crosstalk. Furthermore, those areas where thickness of the insulation layer is inadequate are more prone to pinholes and cracking from bending or abrasion. As wire manufacturers continue to push for higher line speeds, eccentricity becomes one of the major limiting factors. Melt fracture and its effect on conductor eccentricity is described in an article by J. S. Borke entitled, "Oscillatory Flow of Polypropylene and Its Effect on Conductor Eccentricity," Proceedings of the International Wire and Cable Symposium, 47, 294–298 (1998).

It is highly desirable to have PP compositions within the desired melt flow range suitable for insulating wires and cables which exhibit improved melt flow during extrusion coating, thus minimizing eccentricity within the finished insulated article. It is more advantageous if the compositions are capable of being utilized at high line speeds for the production of telecommunication singles.

U.S. Pat. No. 4,375,531 to Ross discloses high impact visbroken, either by chemical or thermal treatment, blends of propylene and ethylene polymer components. Even though in one embodiment Ross discloses the compositions can be reactor-made or physically blended mixtures of PP and random copolymer of propylene and ethylene with an ethylene polymer, such as HDPE, the reference does not disclose use of the visbroken blends for wire and cable extrusion coating. More importantly, Ross does not disclose or even remotely suggest that, by judicious selection of the polymer components, high melt flow rate compositions with significantly improved melt flow suitable for high-speed wire and cable extrusion can be obtained.

SUMMARY OF THE INVENTION

According to the present invention, there is provided dynamically modified composition suitable for high-speed wire extrusion coating and which exhibit improved melt flow under high shear comprising (a) about 80 to 97.5 weight percent, based on the total weight of the polymer components, of a first polymeric component selected from the group consisting of (i) reactor-made intimate mixtures of crystalline polypropylene homopolymer having an isotacticity index greater than 80 percent and melt flow rate from 0.1 to 10 g/10 min and amorphous or semi-crystalline ethylene-propylene copolymer having an ethylene content of 20 to 60 weight percent and log complex viscosity at 0.1 rad/sec and 210° C. of 5.7 or greater and (ii) post-reactor blends of crystalline polypropylene homopolymer having an isotacticity index greater than 80 percent and melt flow rate from 0.1 to 10 g/10 min and ethylene-propylene rubber having an ethylene content of 50 to 80 weight percent and log complex viscosity of 0.1 rad/sec and 210° C. of 5.3 or greater; (b) 2.5 to 20 weight percent, based on the total weight of the polymer components, of a second polymer component which is a fractional melt index ethylene homopolymer or copolymer having a density greater than 0.935 g/cm$^3$; and (c) 100 to 1000 ppm, based on the total weight of the polymer components, of an organic peroxide having a decomposition temperature less than 230° C.

In one particularly useful embodiment of the invention, the extrusion composition is comprised of 85 to 95 weight percent of a first polymer component wherein the PP and EP are present at a weight ratio of 5:1 to 1:1 and the PP has an isotacticity of 90 to 98 percent; the second polymeric component is a PE homopolymer or copolymer having a density from 0.940 to 0.958 and melt index from 0.1 to 0.8 g/10 min; and the organic peroxide has a half-life greater than one minute at 160° C. and is present in an amount from 100 to 600 ppm, based on the total weight of the first and second polymeric components. In an even more preferred embodiment, the organic peroxide is 2,5-dimethyl-2, 5-di(t-butylperoxy)-hexane.

The invention also provides extrusion coated articles comprising a wire or cable which is substantially uniformly coated with a 10 to 50 mil thick layer of the above-defined extrusion coating composition. The coated wire and cable articles may be adapted for use as electrical conductors or for the transmission of light. Insulated wires and cables obtained by extrusion coating 20 to 26 AWG copper wire with a 7 to 10 mil thick layer of the extrusion composition are particularly useful.

DETAILED DESCRIPTION

The extrusion compositions of the present invention which exhibit improved melt flow under high shear suitable for use on high-speed extrusion lines are dynamically modified blends of crystalline, i.e., isotactic, polypropylene homopolymer with specific ethylene copolymers having a rubbery or amorphous phase crystalline ethylene polymer and peroxide. Isotacticity of the PP will be 80 percent or greater. More specifically, the improved compositions of the invention comprise (a) a major proportion of a first polymer component which is an in-reactor or post-reactor produced mixture of crystalline PP homopolymer and a high molecular weight amorphous or semi-crystalline ethylene-propylene (EP) copolymer, (b) a minor proportion of a second polymer component which is a medium to high density ethylene homopolymer or copolymer having a fractional melt index and (c) an organic peroxide. The first polymeric component may be directly produced in the polymerization reactor(s) or may be a post-reactor blend.

Dynamic modification entails heating the blend under shear conditions and at a temperature sufficient to melt the polymers and decompose the organic-peroxide. Since it is known that propylene polymers undergo visbreaking and ethylene polymers undergo chain extension reactions in the presence of peroxides under these conditions, it is believed that the blends of the invention have a unique, complex network structure as a result of associations between the various molecular species formed during processing. These associations are believed to impart the improved rheological behavior, specifically, melt fracture-free extrudates during extrusion.

The first polymeric component used to obtain the formulations of the invention contains both amorphous and crystalline phases. Such polymer mixtures comprise the major constituent of the extrusion composition and are therefore sometimes referred to herein as the base resin. The mixtures can be directly synthesized, i.e., reactor-made, or obtained by post-reactor blending two or more polymers obtained from different polymerization processes. In either case, the amorphous ethylene-propylene copolymer component must have a molecular weight above specified limits, as determined by rheological means. The crystalline PP homopolymer will typically have a melt flow rate from 0.1 to 10 g/10 min and 80 to 98 percent isotacticity. When directly synthesized, i.e., reactor-made, the EP copolymer will have a value for log dynamic complex viscosity ($\eta^*$) measured at 0.1 rad/sec and 210° C. of 5.7 or above whereas, when post-reactor blended by physically mixing an EP copolymer with a PP homopolymer, the EP copolymer will have a log complex viscosity at 0.1 rad/sec and 210° C. of 5.3 log viscosity or above. All reference to log complex viscosity herein is to the base 10 (as opposed to the natural log). The weight ratio of PP to E/P will range from 9:1 to 0.15:1 and, most preferably, will be from 5:1 to 1:1.

Reactor-made base resins which are intimate mixtures of PP homopolymer and amorphous or semi-crystalline EP copolymer are produced utilizing known technology wherein the polymerizations are carried out in dual reactors connected in series. The use of dual or cascading reactors of the copolymerization of propylene and ethylene to produce impact copolymers is known (see Ross U.S. Pat. No. 4,375,531). Similarly, gas-phase polymerizations utilizing stirred, fixed beds comprised of small polymer particles are also known. For additional information regarding gas-phase polymerizations and a schematic flow diagram of the process, reference may be made to the article by Ross, et al., in Ind. Eng. Chem. Prod. Res. Dev., 1985, 24: 194–154. Whereas it is most advantageous to conduct both polymerizations in the gas phase, either the first or second reactor may be operated in a mode other than gas phase.

In a first reactor, propylene is homopolymerized typically at a temperature from 50° C. to 100° C. and pressure from 250 psig to 650 psig utilizing a titanium catalyst and an organoaluminum cocatalyst. More preferably, the temperature in the first reactor will be from 50° C. to 90° C. and the pressure will range from 300 psig to 450 psig.

The highly isotactic PP homopolymer produced in the first reactor is directly fed to a second reactor maintained at 25° C. to 80° C. and 100 psig to 500 psig where propylene and ethylene are copolymerized in the presence of the homopolymer. An amount of ethylene is employed in the second reactor to produce an EP copolymer with rubber-like characteristics and ethylene content from 20 to 65 weight percent. EP copolymers having ethylene contents from 25 to 60 percent are particularly advantageous. Polymerization in the second reactor is generally accomplished without additional catalyst; however, it may be advantageous to introduce more catalyst to the second reactor. If more catalyst is employed, it can be the same or different catalyst used in the first polymerization. Preferably, the second polymerization reactor is operated at 40° C. to 70° C. and 100 psig to 350 psig.

Reactor-made products produced in the above-described manner are intimate mixtures of the highly isotactic PP homopolymer and amorphous or semi-crystalline EP copolymer. Ethylene contents of the reactor-made intimate mixtures can range from 20 weight percent up to 65 weight percent. More typically, the amount of ethylene will be from 25 to 60 weight percent. If desired, other alpha-olefins containing from 4 to 8 carbon atoms can be included in the polymerization and incorporated. Butene-1, hexene-1 and octene-1 are useful comonomers for this purpose.

In an alternate embodiment, the first polymeric component may be obtained by post-reactor blending. This is accomplished by physically blending a PP homopolymer and an EP copolymer rubber (EPR) obtained from separate polymerization reactors. The PP and EPR are subsequently combined and blended, such as by melt blending in a Banbury mixer, extruder mixer or the like, to obtain a homogeneous blend. PP and EPRs employed for post-reactor blends obtained in this manner are commercially available resins produced using conventional polymerization procedures. The amount of PP and EPR copolymer used to obtain post-reactor blends useful for the invention will vary depending on the characteristics of the individual polymers, e.g., isotacticity of the PP and rubbery character of the EP copolymer which is a function of the ethylene content of the copolymer. Useful EPRs for the formation of post-reactor blends will have ethylene contents from 40 to 85 percent and, most preferably, from 50 to 80 percent.

A second polymeric component is necessarily utilized with the above-described reactor-made or post-reactor PP/EP mixtures in order to obtain compositions having improved melt flow under high shear such as may be encountered during high-speed extrusion coating operations. The second component, which constitutes a minor proportion of the total weight of polymer components comprising the composition, is a fractional melt index ethylene homopolymer or copolymer having a density greater than 0.935g/cm$^3$.

Ethylene homopolymers and copolymers having fractional melt indexes, i.e., melt indexes less than 1 g/10 min., and densities greater than 0.935 g/cm$^3$ are commercially available from a commercial suppliers and are generally referred to as medium and high density polyethylenes. The copolymers will contain minor amounts of $C_{3-8}$ alpha-olefins, such as propylene, butene-1, hexene-1 and octene-1. Copolymers of ethylene and butene-1 and ethylene and hexene-1 are particularly advantageous. Densities can range as high as 0.96 g/cm$^3$ or above but, most typically, will be from 0.940 g/cm$^3$ up to 0.958 g/cm$^3$. Melt indexes can be as low as 0.05 g/10 min but, most commonly, are from 0.1 to 0.8 g/10 min.

For the improved compositions of the invention, the first polymeric component, i.e., base resin, will constitute from 80 to 97.5 weight percent of the total polymer components and, more preferably, from 85 to 95 weight percent. The second polymer component, which is present in a minor amount, typically ranges from 2.5 to 20 weight percent, based on the total weight of the polymer components and, more preferably, from 5 to 15 weight percent.

A small amount of organic peroxide is included with the first and second polymer components during dynamic modification in order to obtain compositions which exhibit reduced oscillatory flow. Up to 1000 ppm peroxide, based on the total weight of the polymer components, can be employed. Most commonly, the amount of peroxide ranges from 75 to 1000 ppm and, more preferably, from about 100 to 600 ppm. Useful organic peroxide generally have decomposition temperatures less than 230° C. The peroxide may be directly injected into the mixer or extruder used for the dynamic modification or it can be physically adsorbed onto either the first or second polymer components or other inert materials, such as silica, and introduced in this manner.

Any of the known organic peroxides commonly utilized to generate free radicals can be used but it is preferred to utilize peroxides which have negligible decomposition below 120° C. and a half life greater than one minute at 160° C. Suitable peroxides include di-(t-butyl)peroxide, dicumyl peroxide, 2,5-dimethyl-2,5-di(t-butylperoxy)-hexane, 2,5-dimethyl-2,5-di-(t-butylperoxy)-hexyne-3, butyl-4,4-bis(t-butyl peroxyvalerate), cumyl hydroperoxide, 1,1-bis-(t-butylperoxy)3-,3,5-trimethylcyclohexane, 1,3-di-(t-butylperoxy)di-isopropylbenzene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide, (t-butylperoxy)-butyrate and the like. A preferred peroxide is 2,5-dimethyl-2,5-di(t-butylperoxy)-hexane. As previously mentioned, the organic peroxide may be adsorbed on a suitable filler, such as talc or silica, to facilitate introduction. This is particularly advantageous when using in-reactor powders. The amount of organic peroxide on the filler may vary but is generally between about 5 and 30 weight percent. In one highly useful embodiment about 7 to 25 weight percent of 2,5-dimethyl-2,5-di-(t-butylperoxy)-hexane is adsorbed on silica.

To obtain the improved Theological properties, i.e., improved, fracture-free melt flow, with the compositions of the inventions, the first and second polymeric components and organic peroxide are combined and dynamically modified. Dynamic modification is typically carried out as part of a mixing (melt-blending) pelletization operation. The pelletized compositions produced in this manner can be conveniently shipped and directly used in conventional (co) extrusion processing equipment. Alternatively, all of the components can be dry blended and dynamically modified as one of the operations in the processors extrusion line.

Compositions produced in accordance with the preceding description have melt flow rates from about 1 to 5 g/10 min and, more preferably, from 1.5 to 3.5 g/10 min and exhibit enhanced melt stability. As a result, they are capable of being extruded at high speeds. They are particularly useful for extrusion coating single or multi-strand wires and cables to provide a uniform 10 to 50 mil thick layer of insulation around the wire or cable which can be a metal conductor or fiber optic material. The ability to eliminate oscillatory flow at high extrusion speeds and minimize eccentricity is particularly advantageous where small diameter wires and/or thin insulation layers are applied, such as for the manufacture of telephone singles. Telephone singles generally have a 7 to 10 mil layer of insulation coated onto 20 to 26 AWG single-strand copper wire.

In addition to their ability to be extruded at high rates, the compositions of the invention have a good balance of physical properties. For example, representative resins suitable for wire and cable insulation applications will have densities from about 0.900 g/cm$^3$ and melt flow rates in the range 1 to 5g/10 min. Representative tensile yield strengths and elongations at break can range from 2800 to 3300 psi and 300 to 600 percent, respectively, as determined by ASTM Test Method D 638. Flexural modulus (1% secant; ASTM D 790) and Shore D hardness (ASTM D 2240) can range from 100000 to 140000 psi and 65 to 75, respectively.

While the compositions are particularly well suited for high-speed extrusion onto wire and cable, they may also be utilized in other extrusion processes such as for foam skin wire and cable applications, manufacture of buffer tubes for fiber optic cables, and the production of mono- or multilayer films. They may be extrusion coated onto various rigid or flexible substrates such as glass, fabric, foil, wood, paper, composite materials and the like. When coextruded they can be applied with one or more other thermoplastic resins or thermoplastic resin blends.

Conventional additives can also be included with the present compositions. The additives may include antioxidants, UV stabilizers, processing aids, nucleating agents, foaming agents, colorants, pigments, metal deactivators and the like. Such additives are known in the art and are generally present at low levels based on the total composition. Additives can be incorporated into either the first or second polymeric components or added to a mixture of the two. They may be incorporated utilizing conventional masterbatch techniques.

The following examples illustrate the invention more fully. Unless otherwise stated, all parts and percentages reported in the examples are on a weight basis. Complex viscosity, which provides a measure of molecular weight and processability was determined on molten polymers over a range of temperatures by non-resonant forced vibration techniques, in accordance with ASTM Test Methods D 4065 and D 4440 utilizing a RHEOMETRICS RDA II rheometer equipped with parallel 25 mm diameter plates and operated at 210° C. with a frequency sweep from 398 to 0.0398 rad/sec and strain of 15 percent. Complex viscosities reported herein are at a frequency of 0.1 rad/sec. Densities were determined in accordance with ASTM Test Method D 1505. ASTM Test Method D 1238 was used to determine melt flow rate (MFR) and melt index.

EXAMPLE 1

To demonstrate the improved results obtained with the compositions of the invention, a formulation was prepared utilizing a post-reactor blend of PP homopolymer and EPR copolymer. The PP homopolymer resin was a commercial resin (PP 51507A manufactured by Equistar Chemicals, LP) having a MFR of 0.6g/10 min. and isotacticity of 95 percent. The EPR was a commercially available copolymer, EPR 878, manufactured by Exxon Chemical Company. The EPR copolymer contained 60 percent ethylene, had a Mooney viscosity of 53 and a log complex viscosity of 5.56.

The PP and EPR were dry blended at a weight ratio of 3:1, respectively, and a small portion of the resulting blend was combined with 2,5-dimethyl-2, 5-di-(t-butylperoxy)-hexane (LUPERSOL 101) in a glass jar on a ball mill roller while gently heating at 70° C. for 5 hours to completely adsorb the peroxide on the pellets. The resulting concentrate, containing 2 weight percent peroxide, was then combined with the remaining portion of the PP/EPR blend and a fractional melt index HDPE (PETROTHENE LR 732 manufactured by Equistar Chemicals, LP, density 0.956g/cm$^3$; melt index of 0.2 g/10 min) so that the composition of the final product was as follows:

| | |
|---|---|
| 69% | PP |
| 25% | EPR |
| 6% | HDPE |
| 150 ppm | peroxide. |

The mixture was dynamically modified by melt-blending and pelletizing using a Leistritz twin screw extruder (1.5 inch screw diameter) configured as follows.

| | |
|---|---|
| Zone 1 | 152° C. |
| Zone 2 | 152° C. |
| Zone 3 | 163° C. |
| Zone 4 | 177° C. |
| Zone 5 | 204° C. |
| Zone 6 | 221° C. |
| Zone 7 | 221° C. |
| Zone 8 | 232° C. |
| Zone 9 | 232° C. |
| Die | 232° C. |

The resulting pelletized resin blend had a MFR of 2.9 g/10 min. The melt stability of the composition was evaluated to determine the critical screw speed (CSS) at the onset of melt distortion. For this test, a Davis-Standard 2.5 inch single screw extruder fitted with a Genca 0.04 inch single angle geometry die head was employed. The temperature profile of the extruder was as follows:

| | |
|---|---|
| Zone 1 | 204° C. |
| Zone 2 | 218° C. |
| Zone 3 | 232° C. |
| Zone 4 | 246° C. |
| Adapter | 249° C. |
| Die 1 | 254° C. |
| Die 2 | 260° C. |

As the screw speed was increased, the onset of melt distortion was determined by visual inspection of the extrudate and noting the first evidence of wavy surface roughness of the extrudate. This was reported as the CSS. The CSS for the above-prepared composition of the invention was 52 rpm. The significance of this result is apparent when compared to CSS values obtained with two similar compositions which were identically prepared and evaluated. The first formulation, which utilized the same PP and EPR at the same weight ratio and the same type and amount of peroxide but contained no HDPE, had a CSS of only 30 rpm. A second composition, identical to that of the invention except the log complex viscosity of the EPR used was only 5.08, had a CSS of only 25 rpm. The improvement obtained with the composition of the invention was further illustrated by extruding the compositions onto copper wire. For these extrusions, the extruder screw speed was increased from 30 to 47 rpm to observe how this change affects eccentricity. The same Davis-Standard extruder and temperature profile were to coat 24 AWG (0.0201 inch diameter) copper wire at a line speed of 1200 ft/min. Eccentricity was determined from optical micrographs of insulation cryogenically cut from coated wire samples after removing the copper wire. Percent eccentricity was calculated using the following equation:

$$\% \ eccentricity = \frac{a-b}{a+b} \times 100$$

where a is the maximum observed insulation thickness and b is the minimum observed insulation thickness. Percent eccentricity obtained with wire produced using the compositions of the invention at 30 and 47 rpm was 2.5% and 3.5%, respectively. Eccentricity obtained using the second comparative composition described above was 5.7% (30 rpm) and 15.3% (47 rpm). While the percent eccentricity is significantly higher, i.e., poorer, for the wire produced using the comparative formulation at both screw speeds, it is even more significant that the percent eccentricity increased 168% when the screw speed was increased by only 17 rpm. The same increase in screw rpm with the compositions of the invention produced only a 40% increase in eccentricity.

EXAMPLE 2

To demonstrate the ability to vary the compositions of the invention, the following insulation formulation was prepared and evaluated for CSS in accordance with the procedure of Example 1. The first and second polymeric components and organic peroxide used were the same except that the final composition was as follows:

| | |
|---|---|
| 65% | PP |
| 25% | EPR |
| 10% | HDPE |
| 200 ppm | peroxide |

The dynamically modified composition had a MFR of 2.9 g/10 min and excellent melt stability. When evaluated in the CSS test, no melt distortion of the extrudate was observed up to 90 rpm - the rpm limit of the extruder. A CSS greater than 90 rpm represents a more than four-fold increase in melt stability over heretofore available propylene polymer wire and cable insulation resins.

COMPARATIVE EXAMPLE A

While it is possible to produce polypropylene resin compositions with melt flow rates suitable for extrusion in wire and cable applications in other ways, the melt stability of these resins has been deficient thus limiting the ability to use these resins in high-speed extrusion applications. This is demonstrated by the following example wherein a propylene composition having a melt flow rate comparable to that of the inventive compositions was prepared. This was accomplished by combining the polypropylene homopolymer and peroxide used in Example 1 in the absence of the EP and HDPE and visbreaking the PP to a melt flow rate of 4.2 g/10 min utilizing the same extruder and conditions. The visbroken polypropylene homopolymer was then combined with 25 weight percent of the EPR copolymer (EPF 876) and 6 weight percent HDPE (PETROTHENE LR732) but without peroxide. The resulting resin composition had a melt flow rate of 2.8 g/10 min; however, when the product was evaluated in the CSS test, it was only possible to run the extruder to 19 rpm before onset of melt distortion.

EXAMPLE 3

An extrusion composition was prepared utilizing an in-reactor produced intimate mixture of crystalline PP homopolymer with an amorphous random EP copolymer as the first polymeric component. Since the mixture was obtained as a reactor powder, the PP and EP components of the mixture were isolated in order to characterize the polymers. This was accomplished by fractionating the mixture using temperature rising elution fractionation (TREF), a recognized procedure for separating polymer species based on differences in crystallizability in accordance with the procedure of Wild, et al., (1992),"Development of High Performance TREF for Polyolefin Analysis," *Proceeding of Am. Chem. Soc., Div. Of Polym. Mat. Sci. and Eng.*, 67:153. The PP homopolymer had an isotacticity of 93 percent and MFR of 0.4 g/10 min. The EP rubbery component of the in-reactor intimate mixture had an ethylene content of 56 percent, and a log complex viscosity of 5.97. The approximate weight percent of the EP copolymer in the mixture was 23 percent. The extrusion composition was prepared by dry blending the HDPE (PETROTHENE LR 732) and organic peroxide (LUPERCO 101-P20; 20 percent 2,5-dimethyl-2, 5-di-(t-butylperoxy)-hexane adsorbed on silica) with the reactor powder in the appropriate ratios to produce a composition which contained 68 percent PP, 20 percent EP, 10 percent HDPE and 520 ppm of the active organic peroxide component, i.e., excluding the silica adsorbent. The composition was dynamically modified by melt-blending and pelletizing as described in Example 1. The resulting resin had a melt flow rate of 2.9 g/10 min and the CSS exceeded the limits of the extruder being used for the test, i.e., greater than 90 rpm.

EXAMPLE 4

Example 3 was repeated except that the amount of active organic peroxide used was increased to 550 ppm. The MFR of the resulting extrusion composition was 2.8 g/10 min and the CSS was greater than 90 rpm.

EXAMPLE 5

Example 3 was repeated except that the amount of active organic peroxide was decreased to 450 ppm. The dynamically modified composition had an MFR of 2.8 g/10 min and CSS of 55 rpm.

COMPARATIVE EXAMPLE B

Example 3 was repeated utilizing an in-reactor produced powder outside the prescribed limits of the invention whereas the PP component of the in-reactor blend was essentially the same as that of Example 3, the EP copolymer component had an ethylene content of 56 percent and a log complex viscosity of 5.5. When combined with various HDPE resins at varying peroxide levels and dynamically modified in accordance with the above-described melt-blending/pelletization procedure, acceptable MFRs ranging from 2.7 to 2.9 g/10 min were obtained but the maximum CSS that could be achieved was only 35 rpm. This CSS is significantly lower than observed with any of the inventive products of Examples 3–5 evidencing markedly inferior melt stability.

We claim:

1. A dynamically modified polymeric extrusion composition having a melt flow rate from about 1 to 5 g/10 min and which exhibits improved melt flow under high shear comprising:
   (a) about 80 to 97.5 weight percent, based on the total weight of the polymer components, of a first polymeric component selected from the group consisting of (i) reactor-made intimate mixtures of crystalline polypropylene homopolymer having an isotacticity index greater than 80 percent and melt flow rate from 0.1 to 10 g/10 min and amorphous or semi-crystalline ethylene-propylene copolymer having an ethylene content of 20 to 65 weight percent and log complex viscosity at 0.1 rad/sec and 210° C. of 5.7 or greater and (ii) post-reactor blends of crystalline polypropylene homopolymer having an isotacticity index greater than 80 percent and melt flow rate from 0.1 to 10 g/10 min and ethylene-propylene rubber having an ethylene content of 40 to 85 weight percent and log complex viscosity of 0.1 rad/sec and 210C of 5.3 or greater;
   (b) 2.5 to 20 weight percent, based on the total weight of the polymer components, of a second polymer component which is a fractional melt index ethylene homopolymer or copolymer having a density greater than 0.935 g/cm$^3$; and
   (c) 75 to 1000 ppm, based on the total weight of the polymer components, of an organic peroxide having a decomposition temperature less than 230° C.

2. The composition of claim 1 having a melt flow rate from about 1.5 to 3.5 g/10 min.

3. The composition of claim 1 wherein the crystalline polypropylene homopolymer of the first polymeric component has an isotacticity from 80 to 98 percent.

4. The composition of claim 1 wherein the weight ratio of the polypropylene homopolymer and ethylene-propylene copolymer of the first polymeric component is in the range 9:1 to 0.5:1.

5. The composition of claim 4 wherein the weight ratio of polypropylene homopolymer to ethylene-propylene copolymer is from 5:1 to 1:1.

6. The composition of claim 1 wherein the second polymer component has a density from 0.940 to 0.958 g/cm$^3$.

7. The composition of claim 6 wherein the melt index of the second polymeric component is from 0.1 to 0.8 g/10 min.

8. The composition of claim 7 wherein the second polymeric component is a copolymer of ethylene with a minor amount of a C$_{3-8}$ alpha-olefin.

9. The composition of claim 1 wherein the first polymer component is a reactor-made intimate mixture of crystalline polypropylene homopolymer and an ethylene-propylene copolymer having an ethylene content from 25 to 60 percent.

10. The composition of claim 1 wherein the first polymeric component is a post-reactor blend of crystalline polypropylene homopolymer and an ethylene-propylene rubber having an ethylene content from 50 to 80 weight percent.

11. The composition of claim 1 wherein the organic peroxide has a half-life greater than one minute at 160° C.

12. The composition of claim 11 wherein the organic peroxide is present in an amount from 100 to 600 ppm, based on the total weight of the first and second polymeric components.

13. The composition of claim 12 wherein the organic peroxide is 2, 5-dimethyl-2,5-di(t-butylperoxy)-hexane.

14. The composition of claim 13 wherein the organic peroxide is adsorbed on silica or talc.

15. The composition of claim 1 wherein the first polymeric component is present in an amount from 85 to 95 weight percent, based on the total weight of the polymer components.

16. An extrusion coated article comprising a wire or cable substantially uniformly coated with a 10 to 50 mil thick layer of the extrusion coating composition of claim 1.

17. The article of claim 16 wherein the extrusion coating composition has a melt flow rate of 1.5 to 3.5 g/10 min; the first polymer component is a polypropylene homopolymer having an isotacticity of 90 to 98 percent and the weight ratio of polypropylene homopolymer to ethylene-propylene copolymer is from 5:1 to 1:1; the second polymeric composition has a density of 0.940 to 0.958 g/cm$^3$ and melt index from 0.1 to 0.8 g/10 min; and the organic peroxide has a half-life greater than one minute at 160° C. and is present in an amount from 100 to 600 ppm, based on the total weight of the first and second polymeric components.

18. The article of claim 17 adapted as an electric conductor.

19. The article of claim 17 adapted for the transmission of light.

20. The article of claim 18 wherein 20 to 26 AWG copper wire is coated with a 7 to 10 mil thick layer of the extrusion coating composition.

* * * * *